May 27, 1952 A. R. WARNER ET AL 2,598,473
ELECTRIC OSCILLATION GENERATOR
Filed Oct. 7, 1949
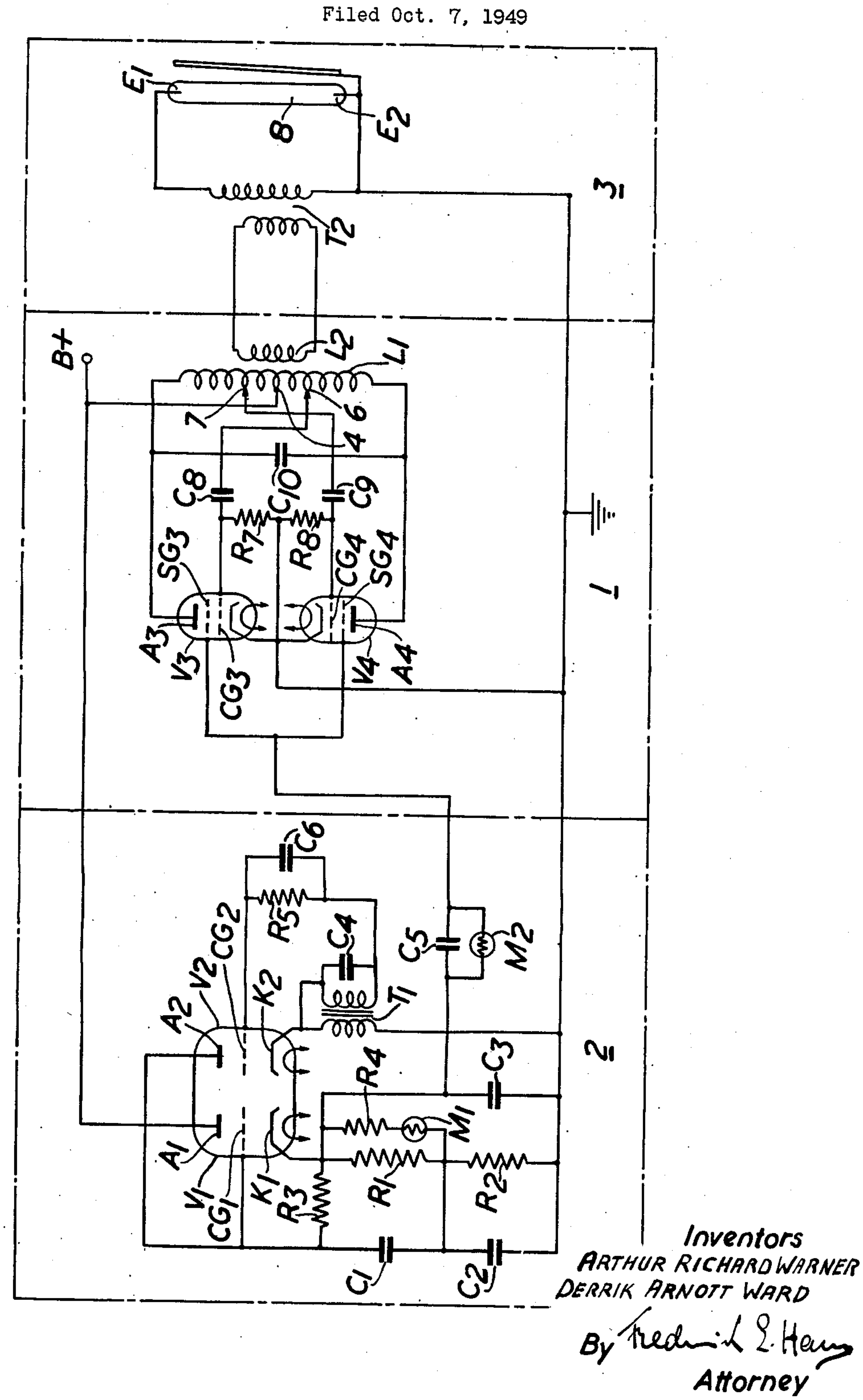
Inventors
ARTHUR RICHARD WARNER
DERRIK ARNOTT WARD
By Frederick L. E. Henry [signature]
Attorney Patented May 27, 1952

2,598,473

UNITED STATES PATENT OFFICE 2,598,473

ELECTRIC OSCILLATION GENERATOR

Arthur Richard Warner, London, and Derrick Arnott Ward, Beddington, England

Application October 7, 1949, Serial No. 120,014
In Great Britain March 1, 1949

5 Claims. (Cl. 250—36)

This invention relates to electric oscillation generators, and is primarily concerned with the provision of means for cyclically increasing the output of a power oscillator gradually from a low or zero output to a substantially greater output. Such an oscillation generator finds application in the operation of gas discharge tubes for advertising and other purposes, in which the discharge in the tube is caused to increase gradually along the tube, then to be extinguished, and to repeat the operation cyclically. Such an arrangement is described, for example, in British Patents No. 399,566 and 423,362.

According to the present invention there is provided a valve oscillator stage, to which is applied a control voltage derived from a sawtooth voltage generator, the sawtooth generator comprising a capacitance adapted to be slowly charged through a resistance or the equivalent of a resistance, such as a valve and discharged rapidly by a valve arranged as a blocking oscillator. Preferably the power oscillator stage makes use of a valve or valves of the screen-grid type, the potential of the screen being varied for control purposes, and in this case the sawtooth generator feeds the screen of the power oscillator through a cathode follower stage.

One arrangement of an electric oscillation generator in accordance with the present invention will now be described, with reference to the accompanying drawing, the oscillation generator in this arrangement being adapted to supply power for the operation of a gas discharge tube in the manner described above.

The drawing shows the oscillation generator, comprising an oscillator stage 1, and a sawtooth generator stage 2, and the gas discharge tube circuit 3, each shown within a rectangle bounded by broken lines.

The oscillator stage 1 has two power tetrode valves $V_2$ and $V_4$ connected as a class "C" push-pull oscillator. The anodes $A_3$ and $A_4$ of the valves $V_3$ and $V_4$ respectively are coupled to opposite ends of a coil $L_1$ to the centre point 4 of which the anode supply is connected from the positive terminal B+ of a conventional high tension supply, the negative terminal of which is grounded. The necessary positive feed-back to the control grids $CG_3$ and $CG_4$ of the valves $V_3$ and $V_4$ is obtained by connecting them through blocking capacitors $C_8$ and $C_9$ to appropriate taps 6 and 7 upon the coil $L_1$. Grid bias is applied to the valves $V_3$ and $V_4$ by means of grid leak resistors $R_7$ and $R_8$.

The gas discharge tube 8, which is shown symbolically only, is coupled to the oscillator stage 1 by a transformer $T_2$ and coil $L_2$ which is coupled to the tank coil $L_2$. The arrangement is such that if the oscillator output is increased gradually from a low value the discharge will spread gradually from the non-grounded electrode $E_1$ towards the grounded electrode $E_2$ and at an appropriate value of oscillator output will extend throughout the tube. If the oscillator output is then reduced sharply to the original low value, which may be zero, the discharge will be extinguished. Thus as described in the aforementioned Patent No. 399,566 the tube may, for example, be in the form of a word so that the extension of the discharge gives the effect of the word being written.

The potential upon the screen-grids $SG_3$ and $SG_4$, which are effectively connected together, is controlled by a sawtooth generator stage 2. This stage, in this particular embodiment of the invention, uses two triode valves $V_1$ and $V_2$, which are shown as the two parts of a multiple valve. The valve $V_1$ is arranged as a cathode-follower type of circuit to provide an output voltage which is applied to the screen grids $SG_3$ and $SG_4$ of the oscillator valves to control the oscillator output.

The valve $V_2$ is arranged as a squegging or blocking oscillator serving periodically to discharge a capacitor in the grid circuit of the first valve.

The valve $V_1$ includes in its cathode circuit two serially connected resistors $R_1$ and $R_2$, which are shunted by a by-pass capacitor $C_3$. The resistor $R_2$ is shunted by a capacitor $C_2$, while a second capacitor, $C_1$, is connected between the grid $CG_1$ of the valve $V_1$ and the upper terminal of the capacitor $C_2$. Values are given to capacitors $C_1$ and $C_2$, and resistors $R_1$ and $R_2$ such that the ratio $R_1/R_2$ is less than the ratio $C_1/C_2$. A grid resistor $R_3$ is connected between the grid $CG_1$ and the cathode $K_1$ of the valve $V_1$; the resistor $R_3$, has a value substantially higher than the resistors $R_1$ and $R_2$.

The valve $V_2$ is arranged as a blocking oscillator and to this end the valve $V_2$ is tightly coupled, by means of a low frequency transformer $T_1$, between its grid and cathode circuits, the grid circuit including a biasing resistor $R_5$ in parallel with a capacitor $C_6$, the time constant of which is high, in the usual manner. The grid circuit winding of the transformer $T_1$ is shunted by a capacitor $C_4$ which determines the frequency of oscillation, and also limits the peak voltage developed.

The anode $A_2$ of the valve $V_2$ is connected to the grid $CG_1$ of the valve $V_1$ and hence also to one terminal of capacitor $C_1$. In known manner, the valve $V_2$ periodically oscillates so as to produce a large pulse of anode current; a positive voltage appearing at the grid $CG_2$ of the valve $V_2$ develops grid current which charges the capacitor $C_6$ negatively and accordingly makes the grid $CG_2$ negative. The positive voltage appearing at grid $CG_2$ is the positive grid voltage which inherently occurs in blocking oscillators due to transformer coupling. The current taken by valve $V_2$ is taken from capacitor $C_1$ which is charged through valve $V_1$. As a result, valve $V_2$ will discharge the capacitor. The aforementioned negative bias of grid $CG_2$ due to the negative charge of capacitor $C_6$ suppresses the anode current until such time as the negative charge on the grid capacitor $C_6$ leaks away and the cycle of operation is repeated.

When the pulse of anode current is produced in the valve $V_2$ the grid $CG_1$ of the valve $V_1$ is made highly negative, and the anode current of the valve $V_1$ is suppressed. For a period depending upon the circuit constants the anode current remains suppressed and then recommences, increasing slowly to a maximum value. Eventually the valve $V_2$ again passes its pulse of anode current and the cycle is repeated. In this way a sawtooth voltage is developed across the resistors $R_1$ and $R_2$ which is applied through the non-linear resistance element $M_2$ to the screen grids $SG_3$ and $SG_4$ of the valves $V_3$ and $V_4$. The effect of applying this voltage to the screen grids $SG_3$ and $SG_4$ is to give a steadily rising oscillator output which is cut off sharply at its maximum. The purpose of the non-linear resistance element $M_2$ and the capacitor $C_5$ is to provide a negative bias on the screen grids $SG_3$ and $SG_4$ where a negative bias is necessary to reduce the oscillator output to zero. With some valves a negative bias may not be necessary in which case the element $M_2$ and capacitor $C_5$ may be omitted. The negative bias is produced owing to the fact that when the sawtooth stage output falls to zero, the voltage previously built up across the capacitor $C_5$ applies a negative bias to the screen grids $SG_3$ and $SG_4$. The charge across the capacitor $C_5$ leaks away slowly through $M_2$ which presents a high resistance to the discharge of capacitor $C_5$.

With this very brief description of the operation of the circuit it is not possible to perceive at once the advantages of the present invention and the following, more detailed, consideration of the circuit is therefore given.

In the first place the operation of the circuit will be easier to understand if values are ascribed to the essential capacitors and resistors. In one example, capacitors $C_1$ and $C_2$ were each .5 mfd. resistors $R_1$, $R_2$ and $R_3$ were respectively 33 kilohms, 100 kilohms and 4 megohms. It will be understood that these values are illustrative only.

Starting with the condition where the valve $V_2$ is just about to pass anode current, the valve $V_1$ is passing anode current; the valve $V_1$ is biased only by grid current passing through the grid resistor $R_3$. The cathode $K_1$ of the valve $V_1$ is therefore at a high potential to ground, due to the voltage drop in the load in parallel with the cathode resistors $R_1$ and $R_2$, and the potential applied to the screen grids $SG_3$ and $SG_4$ of the valves $V_3$ and $V_4$ is at, or approaching, the maximum.

The potential across capacitor $C_1$, due to the potential drop caused by the current passing through resistor $R_1$ will be about one-third of that across capacitor $C_2$, due to the drop across resistor $R_2$.

When the valve $V_2$ passes anode current the valve $V_2$ presents in effect a low value of impedance across the two serially connected capacitors $C_1$ and $C_2$; the upper plate of the capacitor $C_1$, and with it the grid $CG_1$ of the valve $V_1$, is thereby reduced extremely rapidly to almost zero potential. As the cathode $K_1$ of the valve $V_1$ is positive, the valve $V_1$ is driven rapidly far beyond cut-off and the anode current ceases. The potential of the junction point of capacitors $C_1$ and $C_2$ at this time is at a moderately high, positive potential. Because of this, capacitor $C_1$ receives a charge from capacitor $C_2$ which is in reverse direction to that previously applied to capacitor $C_1$ and both capacitors then begin to discharge, capacitor $C_1$ through resistors $R_1$ and $R_3$, and capacitor $C_2$ through resistor $R_2$. It should be emphasized that the relatively rapid discharge of capacitor $C_1$ followed by its charge to a high potential of opposite polarity means that the grid $CG_1$ of valve $V_1$ is biased well beyond anode current cut-off. As explained hereafter the period during which the bias remains beyond the cut-off valve determines the period during which the gas discharge tube is extinguished. The time constant of the circuit including capacitor $C_2$ and resistor $R_2$ is relatively small and the discharge of capacitor $C_2$ has no effect upon the anode current of the valve $V_1$ at this stage. The time constant of the circuit including capacitor $C_1$ and resistors $R_1$ and $R_3$ is relatively high, being of the order of two seconds. Moreover, since resistor $R_3$ is substantially greater than resistor $R_1$ a large proportion of the potential difference appearing across capacitor $C_1$ is applied to the grid $CG_1$ of the valve $V_1$ as a negative bias, which prevents the flow of anode current.

As capacitor $C_1$ discharges via, $R_3$ and $R_1$, this negative bias gradually decreases until the point of anode current cut-off is reached and anode current then begins to flow. Up to this point the potential of the screen grids $SG_3$ and $SG_4$, of the valves $V_3$ and $V_4$ is such that the oscillator output is zero and the gas discharge tube is completely extinguished. When the anode current begins to flow in valve $V_1$ the current through $R_1$ reverses, but not that through $R_3$. The discharge of capacitor $C_1$ is maintained, but now the discharge current flows through the valve $V_1$ instead of through $R_1$. Eventually $C_1$ is completely discharged and commences to recharge with opposite polarity reaching the condition described above just prior to the passage of anode current through the valve.

Thus, the anode current of the valve $V_1$ gradually increases, producing the desired sawtooth output across the resistors $R_1$ and $R_2$.

As soon as anode current commences in the valve $V_1$, there is produced a potential drop across resistor $R_2$, and capacitor $C_2$ is charged accordingly. As the anode current increases the potentials across the capacitors $C_1$ and $C_2$ increase until they attain the limiting values determined by the voltage drops across resistors $R_1$ and $R_2$. At about this point the cycle of operation is repeated.

It will be seen that the ratio of the values of resistors $R_1$ and $R_2$ determines, in part, the potential to which capacitor $C_1$ is charged when the valve $V_2$ is about to take current and therefore the potential to which capacitor $C_1$ is charged in the reverse direction when the valve $V_2$ takes current. The ratio $R_1/R_2$ can thus be varied to control the "off" period of the oscillator stage. This "off" period is also controlled in part by the value of resistor $R_3$, but this resistor, affecting the time constant of the discharge circuit for capacitor $C_1$, has the more important effect of controlling the slope, or rate of increase, of the sawtooth wave which is produced. This slope can be made relatively linear, so that the speed of extension of the discharge can be made relatively constant. The total cycle time is controllable by the time constant of the grid bias circuit of the valve $V_2$.

It will be seen, therefore, that the present invention permits control of the power oscillator so as to control the "off" period of the tube, the speed of the extension of the discharge, that is the speed of "writing" where it is a word sign, and the cycle time of the discharges. It is also possible to control the slope of the trailing edges of the sawtooth waves, by means of an additional time constant circuit composed by an additional resistor connected between the junction of the resistor $R_3$ with the lead to the anode $A_2$ of the valve $V_2$, and the grid $CG_1$ of the valve $V_1$ and an additional capacitor connected between the grid $CG_1$ and the junction of the capacitors $C_1$ and $C_2$.

The cathode resistor $R_1$ may, as shown, be shunted by a non-linear resistance element $M_1$ in series with a resistor $R_4$ to linearise the charging voltage of the capacitor $C_1$. Although in the above arrangement a blocking oscillator has been provided for controlling the cycle of operation of the sawtooth generator, it will be understood that other suitable devices may be used for this purpose.

Where it is desired to operate several discharge tubes in this manner each with its own oscillator it is only necessary to provide one blocking oscillator or like discharge means to control the sawtooth generator of each oscillator. Alternatively, each discharge tube may be provided with its own complete oscillation generator including sawtooth generator and blocking oscillator, and by suitable interconnection one blocking oscillator may be used to trigger the remaining blocking oscillators so that operation of all the discharge tubes is synchronised.

What is claimed is:

1. An electric oscillation generator comprising in combination a valve oscillator stage, a sawtooth waveform generator, said sawtooth waveform generator comprising a capacitance, means for varying the charge on said capacitance relatively slowly by discharging it from a condition of predetermined charge and polarity and recharging it with opposite polarity, and means for discharging said capacitance and recharging it with opposite polarity to said condition relatively rapidly, an impedance across which the output of said sawtooth waveform generator is developed and means the potential of which controls the output of said oscillator stage connected to said impedance.

2. In an electric oscillation generator, at least one multi-electrode oscillator valve connected in regenerative circuit, a sawtooth wave-form generator comprising a capacitance, means for varying the charge on said capacitance relatively slowly from a charge of one polarity to a charge of opposite polarity, a blocking oscillator for discharging said capacitance from said charge of opposite polarity relatively quickly, means for charging said capacitance relatively quickly to said charge of one polarity, and means for applying the output voltage of said sawtooth waveform generator to an electrode of said oscillator valve for controlling the oscillatory output thereof.

3. In combination, oscillatory means for generating high frequency oscillations, means for generating a sawtooth waveform voltage comprising a capacitance, means for varying the charge of said capacitance relatively slowly from a charge of one polarity to a charge of opposite polarity, means for varying the charge of said capacitance relatively quickly from said charge of opposite polarity to said charge of one polarity, and means for applying said voltage to said oscillatory means to control the power output thereof.

4. In combination, an electrical oscillator, said electrical oscillator comprising two tetrode valves connected in push-pull relationship with their screen grids commoned, a cathode-follower valve stage comprising a valve, two series resistors in the cathode lead of said valve, a third resistor in the grid-cathode circuit of said valve, and two series capacitors in shunt with the three resistors, the junction of said two capacitors being connected to the junction of said two cathode lead resistors, a blocking oscillator valve circuit, the anode-cathode path of which is connected in shunt with said two capacitors for periodically presenting a low impedance path across said capacitors, and a connection from the cathode of said cathode follower valve to said commoned screen grids for applying the voltage developed across said two series resistors thereto.

5. In a gas discharge tube control circuit; a valve oscillator source of high frequency oscillations adapted to be connected between the electrodes of said gas discharge tube; a valve for said valve oscillator source having anode, cathode and at least one grid for controlling the power output of said source; a capacitor; valve means for charging said capacitor, said capacitor being connected in anode current controlling relationship to said valve means; resistance means in the cathode circuit of said valve means; a blocking oscillator connected to said capacitor for periodic discharge thereof at an appreciably quicker rate then the rate of charge thereof; and means for applying the voltage developed across said resistance means to the grid of the valve of said valve oscillator source.

ARTHUR RICHARD WARNER.
DERRICK ARNOTT WARD.

REFERENCES CITED

The following references are of record in the file of this patent:

UNITED STATES PATENTS

| Number | Name | Date |
|---|---|---|
| 1,893,029 | Hund | Jan. 3, 1933 |
| 2,121,829 | Seaman et al. | June 28, 1938 |
| 2,143,397 | White | Jan. 10, 1939 |
| 2,491,342 | Townshend | Dec. 13, 1949 |
| 2,554,172 | Custin | May 22, 1951 |